No. 799,164. PATENTED SEPT. 12, 1905.
T. B. JEFFERY.
PNEUMATIC TIRE.
APPLICATION FILED NOV. 21, 1904.
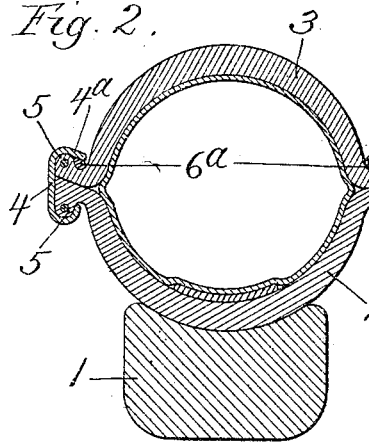
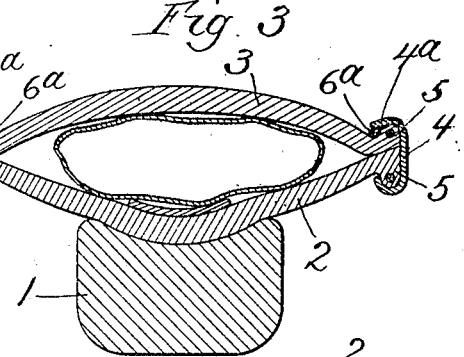
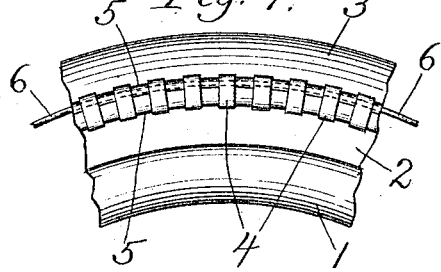
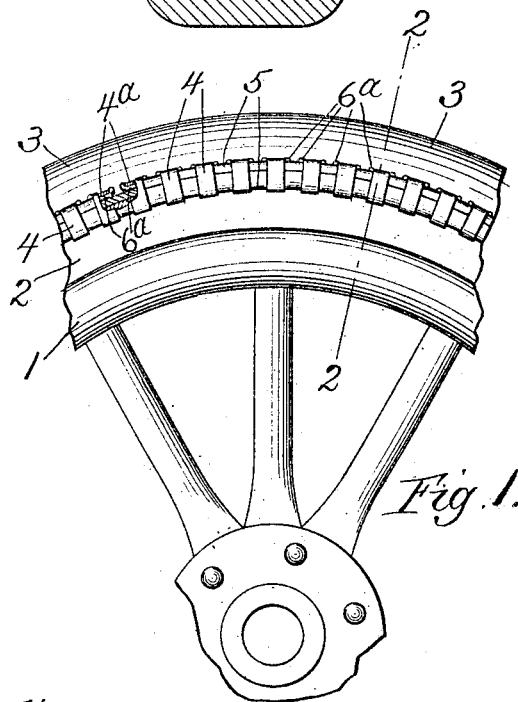
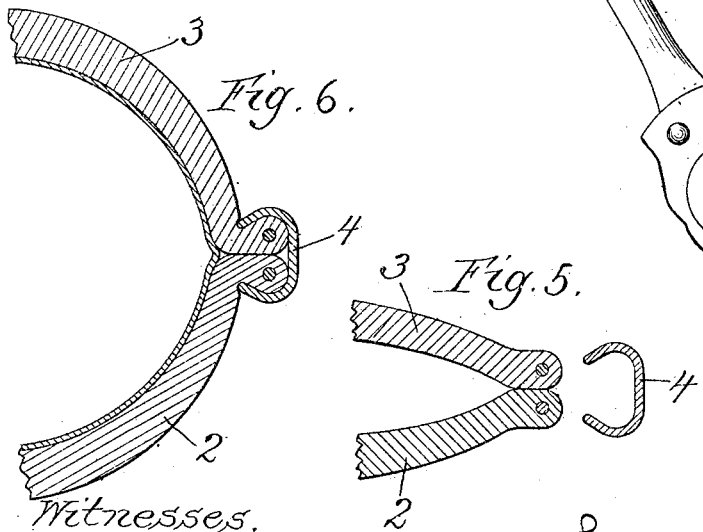
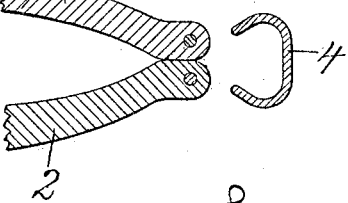
Witnesses.
Edward T. Wray.
Fred G. Fischer
Inventor.
Thomas B. Jeffery
by Burton & Burton
his Atty's

UNITED STATES PATENT OFFICE.

THOMAS B. JEFFERY, OF KENOSHA, WISCONSIN.

PNEUMATIC TIRE.

No. 799,164. Specification of Letters Patent. Patented Sept. 12, 1905.

Application filed November 21, 1904. Serial No. 233,699.

*To all whom it may concern:*

Be it known that I, THOMAS B. JEFFERY, a citizen of the United States, residing at Kenosha, in the county of Kenosha and State of Wisconsin, have invented new and useful Improvements in Pneumatic Tires, of which the following is a specification, reference being had to the accompanying drawings, forming a part thereof.

This invention is designed to be an improvement in pneumatic tires particularly adapted for use on heavy vehicles, but not limited to such use.

It consists of the features of construction set out in the claims.

In the drawings, Figure 1 is a detail side elevation of a portion of a tire embodying this invention, same being shown applied to a segment of the wheel, the tire being distended, as by inflation. Fig. 2 is a section at the line 2 2 on Fig. 1. Fig. 3 is a view similar to Fig. 2, showing the tire collapsed. Fig. 4 is a detail side elevation of a portion of a tire, showing a slight modification of the securing device or filler. Fig. 5 is a partial transverse section of a tire having a somewhat modified form in cross-section of the two elements, same being shown dissected or as it would appear with the hooks separated from the tire edges. Fig. 6 is a similar view of such tire shown inflated.

The present invention is in certain respects intended as an improvement upon the tire for which there was granted to me September 2, 1902, Patent No. 708,482, and the improvements have the same general purpose as stated in that patent—viz., to reduce the liability of a pneumatic tire to deteriorate by what may be called "internal wear"—*i. e.*, the tendency of the alternate contraction and expansion and bending and flattening to break down the structure of the fabric.

The effect, especially at the sides, (of the customary cylindrical tire,) of the flattening to which every part of the whole circumferential extent of the tire is exposed as the wheel rolls while carrying a load is to bend the fabric in a very short curve transversely with respect to the tire, stretching the outer fibers and compressing the inner fibers as compared with their normal condition under inflation. Such action, alternating with the resumption of the cylindrical form which the inflation tends to maintain, produces a back-and-forth bending or hinge-like action at the sides, which grinds the fibers constantly back and forth upon each other, rapidly exhausting the tenacity and elasticity of the structure and rendering it particularly liable to rupture at the sides. The result is that although the sides are exposed to far less direct work on the roadway than is the center of the tread nevertheless round tires are found ruptured at the sides more frequently than they are found worn through or ruptured by wear at the tread. This result is primarily due to the normally cylindrical form which involves the sharp bending at the sides, as above described, when the tire is flattened at the tread as it rolls on the roadway. This defect is avoided by making the tire so that it has the seam or seams or other form of junctions between the parts which compose it located laterally—at the point where the sharp bend would occur—instead of having at the sides the continuous fabric which must be exposed to such sharp bending. This principle of construction is followed in the form of tire herein shown.

1 represents the rim of the vehicle-wheel, whose outer periphery is slightly hollowed for seating the tire thereon. The tire consists of an inner and outer concentric band 2 and 3, respectively, which may be constructed in a customary manner of making outer casings for double-tube pneumatic tires—that is to say, they are each approximately flat in cross-section before being applied to the wheel, a slight initial curvature such as is seen in Fig. 3, being, however, normal. These two flexible bands, the inner of which is seated upon the periphery of the wheel-rim encompassing the latter and the outer of which encompasses the former, are connected together at their lateral edges by hooks 4 4 4, &c., to any number found desirable distributed throughout the circumference of the wheel. In the form shown in Figs. 1 to 4, inclusive, both of the tire elements 2 and 3 are formed with beads or heavy marginal bosses 5 5 at their lateral edges adapted to engage in the recesses of the hooks 4, and when the corresponding edges of both the tire elements are thus engaged in a hook the span of the hook is fully occupied by the two beads, as seen in the drawings; but one lip 4ª of the hook is more widely open than the other, so that when the hook is engaged over the two beads or marginal bosses of the tire elements before inflation—that is, while the said tire elements are approximately flat—there remains in the node or angle between the main body of one of the tire elements and its bead a space under the more widely open hook-lip, which may be occupied by a filler, but which when unoccupied permits the easy disengagement of the bead or marginal boss of the outer tire element from the hook. The two elements being properly located with respect to each other and connected together by the hooks at both edges before inflation are rendered undisengageable and the hooks rendered unremovable by entering in said space a filler, which may consist either of a continuous ring 6, of wire, braid, cord, or rod of suitable diameter or cross-section to occupy the spaces in question under all the hooks throughout the circumference of the wheel or by an individual filler or key 6ª at each hook. The drawings show hooks as applied so that the more widely open lip overhangs the outer tire element. In order to relieve the user of the necessity of exercising more care in placing the hooks than might be convenient to bring the more widely spaced lips all on the outer side and to make it possible to employ them placed in either way—i. e., with the widely-open lip either at the outer or the inner side of the junction-seam between the two tire elements—the individual fillers may be provided. Convenient material for such individual fillers is block-tin wire or rod of proper diameter to occupy the space under the lip of a suitable length, so that being inserted the ends may be bent out to clench around the edge of the hook-lip, and so prevent dislodgment of the filler. The block-tin wire, it will be understood, can be readily manipulated with the fingers. When the continuous ring is employed, it is preferably of similar diameter, but stiffer material, constituting a hoop more or less elastic, which may be passed over the junction-seam after the hooks are in place all around the wheel before inflation, and upon inflation it will be forced into the space under the more widely spaced hook-lips.

I do not limit myself to any particular form of filler. Any material of sufficient firmness to be forced into the space and not liable to be compressed too much by the pressure to which it will be exposed therein will serve the purpose; but I consider a comparatively flexible rod or wire, such as that made of block-tin, or several wires forming a cord or braid, to be particularly convenient for the detached or individual fillers, and a hoop or wire of similar diameter and substance in one piece convenient for the filler in that continuous form.

In Figs. 5 and 6 I have shown a form of tire embodying certain of the important features of the tire shown in the other figures, but departing from that form in certain other respects. In the form shown in these latter figures the lateral edges of the two tire elements 2 and 3 are reinforced by the embedding therein of any suitable stubborn element, as a firm cord or braid, as in the other forms, but not in such way as to form a boss or bead protruding noticeably beyond the general surface of the tire when the latter is uninflated, but within or back of these reinforced edge portions. The substance of the tire being comparatively soft and compressible, it is possible to apply the hooks 4 and clench them over the edges of the tire in the manner seen in Fig. 6, causing the points of the hooks to sink somewhat in the substance of the tire inward from the reinforced edge portions, so that when the engagement is complete there are substantial marginal bosses or beads of the tire members engaged in the hook-recesses, and when once thus engaged the inflation of the tire deflecting the two members around the hook-points, as seen in Fig. 6, sinks the hooks still farther and renders the junction secure because of the unyielding character of the reinforced edge portion.

I claim—

1. A pneumatic tire comprising a casing of flexible material closed by joining the lateral edges at the side of the tire, said lateral edges being marginally reinforced, and the means for joining such edges comprising a multiplicity of double-lipped hooks which engage the reinforced edges, distributed throughout the circumference of the tire.

2. A pneumatic tire comprising two concentric flexible bands united at their corresponding lateral edges, said edges being reinforced, and the means of joining them comprising a multiplicity of double-lipped hooks which engage the bands back of the reinforcement, such hooks being distributed throughout the circumference of the tire.

3. A pneumatic tire comprising two concentric flexible bands united at their corresponding lateral edges, said edges being flexible and being also reinforced for diminishing their compressibility, and means for joining such edges consisting of a multiplicity of double-lipped hooks which engage said edges back of the reinforcement and are distributed throughout the circumference of the tire.

4. A pneumatic tire comprising two concentric flexible bands united at their corresponding lateral edges, such edges being provided with beads facing away from the junction plane of the two bands; means for joining them, consisting of a multiplicity of double-lipped or C-shaped hooks distributed about the circumference of the tire and engaging the oppositely-projecting beads of the two bands.

5. A pneumatic tire comprising two concentric flexible bands united at their corresponding lateral edges, said edges being provided with beads facing away from the junction plane of the two bands, the means of joining them comprising double-lipped or C-shaped hooks adapted to engage such oppositely-projecting beads and the keys or fillers interposed under one of the hook-lips.

6. A pneumatic tire comprising two concentric flexible bands united at their corresponding lateral edges, said edges having oppositely-facing beads; means of uniting them consisting of double-lipped or C-shaped hooks which span the abutting edges of the bands and engage their respective beads, one of the hook-lips being more widely open than the other, whereby there is afforded space between the same and the bead, and the key or filler inserted in such space.

7. A pneumatic tire composed of two concentric flexible bands united at their corresponding lateral edges, said edges being provided with beads projecting from the outer surfaces of the bands respectively; means for uniting such edges consisting of double-lipped or C-shaped hooks distributed throughout the circumference embracing the beads; and flexible keys or fillers interposed between one lip and the corresponding bead and clenched or folded outwardly about the hook-lip for retaining the filler in place.

In testimony whereof I have hereunto set my hand, in the presence of two witnesses, at Chicago, Illinois, this 17th day of October, A. D. 1904.

THOS. B. JEFFERY.

In presence of—
M. G. ADY,
FREDK. G. FISCHER.